Feb. 21, 1961 A. CARUSO 2,972,366
MITER GAGE ATTACHMENT FOR BOX JOINTS
Filed May 28, 1959 2 Sheets-Sheet 1
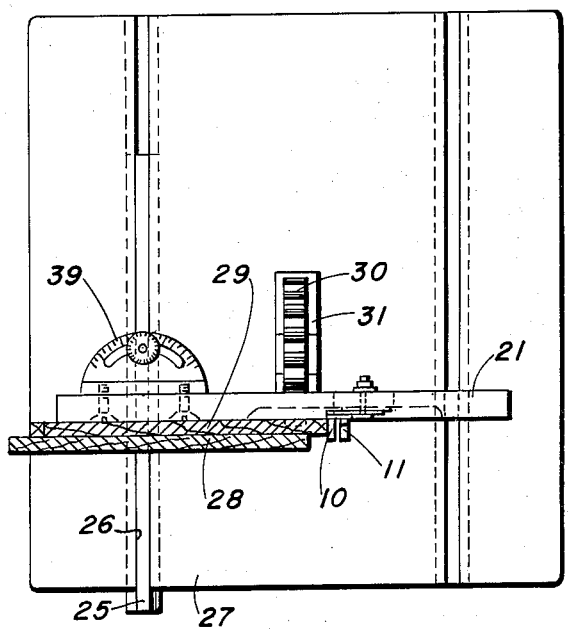
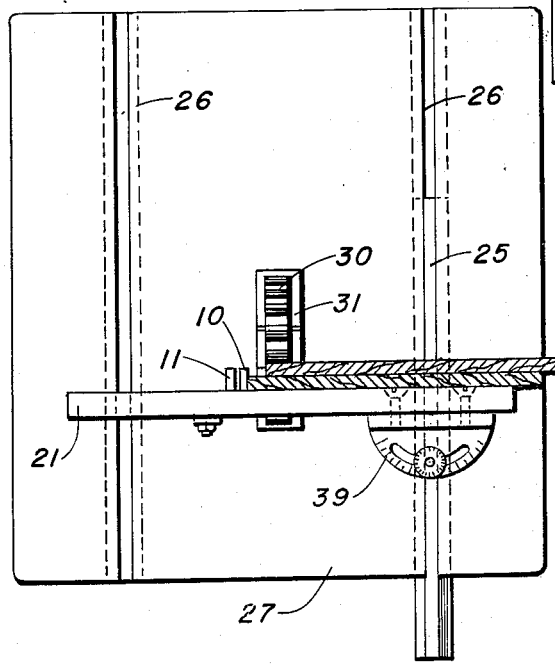
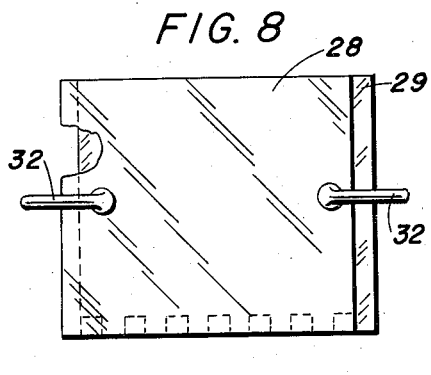
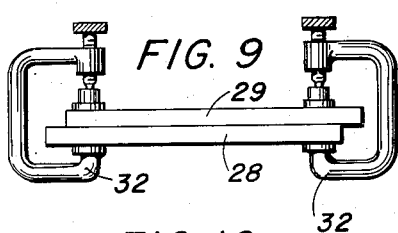
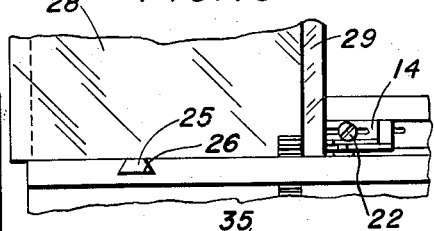
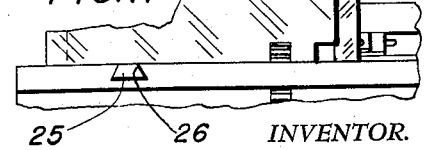
INVENTOR.
ANTHONY CARUSO,
BY *Victor J. Evans & Co.*
ATTORNEYS

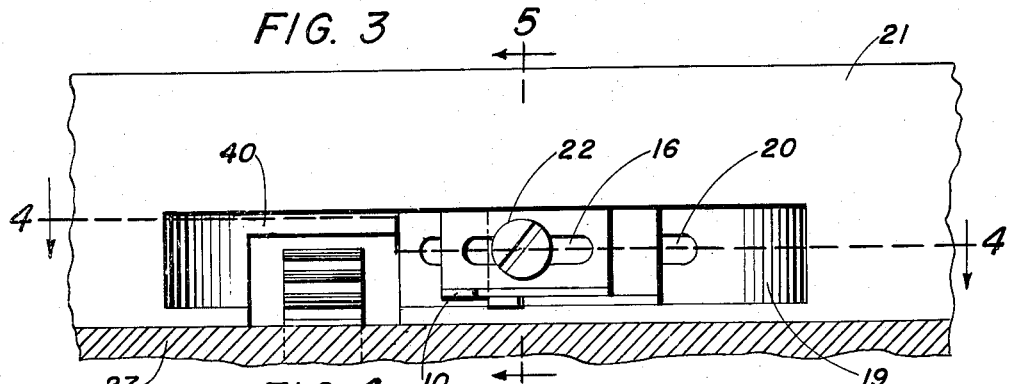
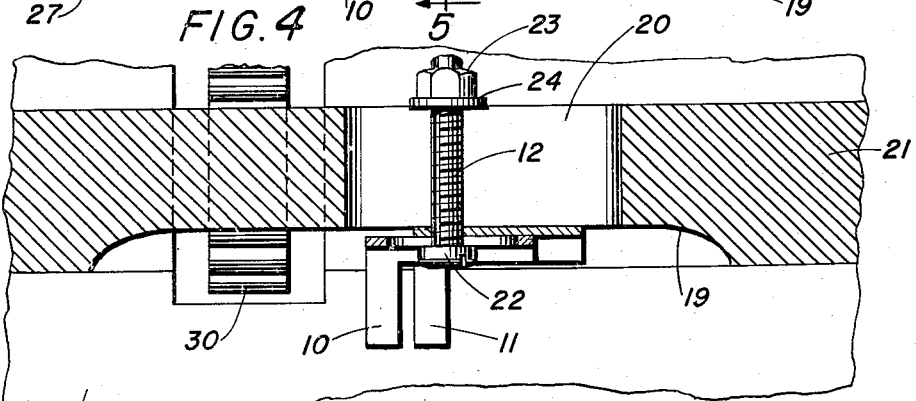
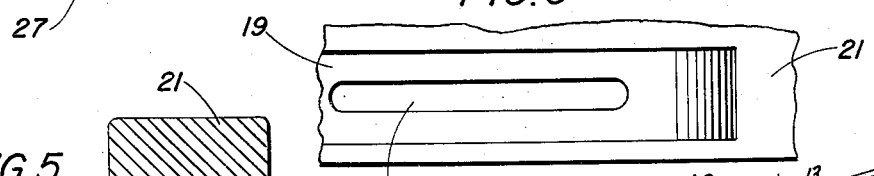
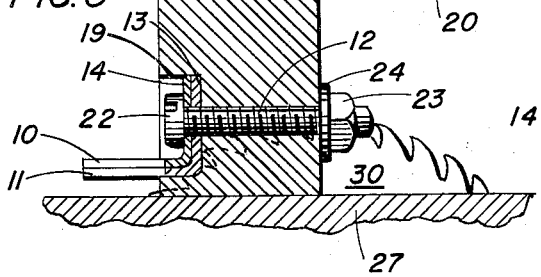
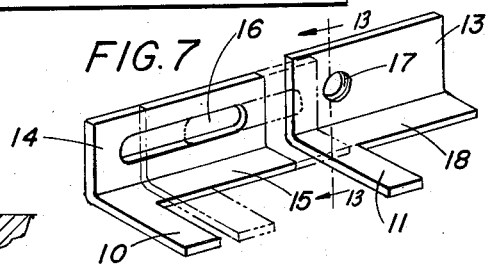
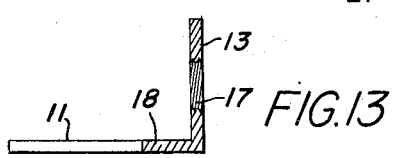
INVENTOR.
ANTHONY CARUSO,

United States Patent Office 2,972,366
Patented Feb. 21, 1961

2,972,366

MITER GAGE ATTACHMENT FOR BOX JOINTS

Anthony Caruso, 445 Catherine St., Fort Lee, N.J.

Filed May 28, 1959, Ser. No. 816,424

2 Claims. (Cl. 144—198)

This invention relates to box joints cut by dado cutters on table saws and the like, and in particular an attachment including adjustably mounted fingers positioned on the conventional wood fence of a table saw and spaced from the dado cutter a distance equal to the width of the cutter, whereby with the distance between outer edges of the fingers set to correspond with the width of the dado cutter, dados and tongues of a box joint are accurately cut.

The purpose of this invention is to provide a gauge for use in combination with a dado cutter whereby the slots and tongues of a box joint are accurately cut throughout the length of the joint.

In the conventional method of making box joints, a dado head of approximately the same width as the slots and wood is positioned in a table saw, and a guide fence is prepared by edge cutting a set of boards. By this means, it is a hit or miss set-up as the wood fence must be shifted as widths of dados change; and the guide pin is smaller than the dado, making positioning of the fence in relation to the dado head a problem. Without a definite guide or stop there is always a chance of the material moving slightly causing spacing between the cuts to vary. In such cases the material is discarded as the sides would not interlock when assembling.

With this thought in mind, this invention contemplates a pair of guide fingers adjustably mounted on a fence whereby the distance between outer surfaces of the fingers and also the distance of the fingers from the dado cutter are accurately set so that with the fingers in a slot formed by a dado cutter as the next slot is cut the width of all of the dados or slots is equal to the width of the spaces between the slots, thereby making it possible to obtain a close fitting box joint.

The object of this invention is, therefore, to provide a gauge for use on a fence of a table saw whereby the width of the dados and tongues between the dados are equal throughout the length of the joint formed by the machine.

Another object of the invention is to provide a gauge for cutting box joints in which the gauge is designed to be used in combination with dado cutters now in use.

A further object of the invention is to provide an improved gauge for dado cutters in which the gauge is of a simple and economical construction.

With these and other objects and advantages in view the invention embodies a pair of fingers, one of which extends from a base plate adjustably mounted on a fence of a table saw and the other which is adjusably attached to the base plate whereby the distance between the fingers is accurately set and whereby the distance between the fingers and the near side of a dado cutter is also accurately set.

Other features and advantages of the invention will appear from the following description taken in connection with the drawings, whereby:

Figure 1 is a plan view of a table saw having a dado cutter therein and in which box material is fed from the left to the right in cutting the edges for making a box joint.

Figure 2 is a plan view of a table saw, similar to that shown in Figure 1, in which the parts are oppositely positioned whereby the material is fed from the right to the left.

Figure 3 is a cross-section through the table of a table saw having a dado cutter therein showing the gauge of this invention mounted on a fence and in which the parts are shown on an enlarged scale.

Figure 4 is a sectional plan through the assembly shown in Figure 3 taken on line 4—4 thereof and showing, in particular, a bolt for clamping the fingers of the gauge to the fence.

Figure 5 is a cross-section taken on line 5—5 of Figure 3 also showing the bolt for clamping the fingers in position on the fence.

Figure 6 is an elevational view showing a portion of the fence and illustrating a recess, in which the gauge elements are mounted on the fence.

Figure 7 is a perspective view illustrating the gauge fingers and mounting elements thereof and with other parts omitted.

Figure 8 (Sheet 1) is an elevational view showing a pair of panels of a box clamped in offset relation and positioned to be cut to form a box joint.

Figure 9 is a plan view of the assembly of the box panels and clamps shown in Figure 8.

Figure 10 is a front elevational view of the dado cutter, with the parts as shown in Figure 1 in which the panels of a box are positioned for the first cut by the dado cutter.

Figure 11 is an elevational view similar to that shown in Figure 10 in which the box panels have been advanced so that the gauge fingers are in the first slot or dado and the second slot or dado is in registering relation with the dado cutter by which the dado has been formed.

Figure 12 is a view showing portions of box panels with the mortise and tenon elements or dados formed by the dado cutter therein.

Fig. 13 is a vertical sectional view on the line 13—13 of Fig. 7.

Referring now to the drawing wherein like reference characters denote corresponding parts the improved gauge for a dado cutter for box joints of this invention includes a pair of fingers 10 and 11 and a bolt 12, the finger 11 extending from a base plate 13 and the finger 10 from a web 14 of an angle or L-shaped member having a plate 15 from one end of which the finger 10 extends. The web 14 is provided with an elongated slot 16 through which the bolt 12 extends and the base plate 13 is provided with an internally threaded opening 17 through which the bolt 12 is threaded. The finger 11 is also provided with a reinforcing plate 18 which extends from the lower edge of the base plate 13.

In use the gauge elements are assembled with the bolt 12 threaded in the opening 17 of the base plate 13 and extended through the slot 16 and the parts are positioned in an elongated recess 19 in which the bolt extends through a slot 20 in a fence 21 in which the recess 19 is also positioned. The bolt 12 is provided with a head 22, a nut 23 and a washer 24.

With the parts as assembled, illustrated and described, on the fence 21 which is provided with tongues 25, slidably mounted in grooves 26 in a saw table 27, panels 28 and 29, positioned against the face of the fence are cut by a longitudinal movement thereof in relation to the dado cutter 30 which extends through a slot 31 of the table.

The panels 28 and 29 are clamped, such as by feed clamps 32 in offset positions, as illustrated in Figures 8 and 9 with edges of the panels offset a distance equivalent to the width of the dado cutter 30. By this means the first cut cuts out a notch in the corner of the panel 28 and forms a dado spaced the width of the dado cutter in the panel 29. With the fingers 10 and 11 accurately positioned in relation to the dado head or cutter the distance between each dado or slot is equivalent to the width of the dado cutter or head. In cutting a box joint the panels are advanced with the fingers inserted in the last dado cut by the dado cutter, and by this means the distance between the grooves or slots is equal to the width of the slots throughout the length of the joint.

As illustrated in Figure 12 panels 33 and 34 are provided with dados, or slots and tenons or tongues 36, at the edge of the panel 33 and oppositely disposed mortises or slots 37 and tenons or tongues 38 in the panel 34.

The fence 21 is provided with an indexing head 39 by which the fence may be set to a right angle in relation to the dado cutter, or to any desired angle and the parts may be positioned, as shown in Figure 1, for feeding the box shook or panels from left to right, or as shown in Figure 2 for feeding the panels from right to left.

The lower edge of the fence 21 is provided with a notch or opening 40 that passes over the dado cutter, as shown in Figure 3.

It will be understood that modifications, within the scope of the appended claims, may be made in the design and arrangement of the parts without departing from the spirit of the invention.

What is claimed is:

1. A dado cutting gauge comprising a vertically disposed base plate having an internally threaded opening extended therethrough and a horizontally disposed finger extended at a right angle from one end of the base plate, a vertically disposed web having an elongated slot therein positioned against the face of the base plate with the slot in registering relation with the internally threaded opening through the base plate, a horizontally disposed finger extended at a right angle from one end of the web and positioned in the same plane parallel to the finger extended from the base plate, and a bolt extended through the slot of the web and the internally threaded opening of the base plate for attaching the fingers to a miter gage fence of a dado cutter.

2. A dado cutter comprising a table having a cutter receiving opening extended therethrough and having longitudinally disposed grooves spaced from and parallel to said opening, a dado cutter operatively mounted in said opening, a transversely disposed miter gage fence positioned on the saw table and having tongues slidably extended into the grooves of the table, the fence having a transversely disposed recess in one side and also having an elongated longitudinally disposed slot extended through the fence from the recess to the opposite side of the fence, a vertically disposed base plate having an internally threaded opening extended therethrough positioned in the recess of the fence and having a horizontally disposed finger extended at a right angle from one end, a vertically disposed web having an elongated slot therein positioned against the face of the base plae and having a horizontally disposed finger extended at a right angle from one end, the finger of the web being parallel to the finger of the base plate, and a bolt extended through the slot of the web and the internally threaded opening of the base plate and positioned in the slot of the fence for clamping the fingers in the recess of the fence.

References Cited in the file of this patent

UNITED STATES PATENTS

| 1,713,329 | Clayton | May 14, 1929 |
| 2,616,459 | Johnson | Nov. 4, 1952 |
| 2,777,485 | Farrow | Jan. 15, 1957 |
| 2,916,063 | Boekenkamp | Dec. 8, 1959 |